United States Patent
Singh et al.

(10) Patent No.: US 12,541,518 B1
(45) Date of Patent: Feb. 3, 2026

(54) LOAD-AWARE SELECTION OF QUERY EXECUTION DATABASES

(71) Applicant: Oracle International Corporation, Redwood Shores, CA (US)

(72) Inventors: Keshav Singh, Baar (CH); Mia Primorac, Zurich (CH); Knut Anders Hatlen, Trondheim (NO); Nitin Kunal, Zurich (CH); Nemanja Stojoski, Zurich (CH); Jian Wen, Hollis, NH (US); Malika Agarwal, Bangalore (IN); Federico Lusiani, Zurich (CH); Georgios Psaropoulos, Opfikon (CH); Cagri Balkesen, Zurich (CH); Norvald Ryeng, Trondheim (NO); Kajori Banerjee, West Bengal (IN); Nipun Agarwal, Saratoga, CA (US); Till Kolditz, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/933,650

(22) Filed: Oct. 31, 2024

Related U.S. Application Data (60) Provisional application No. 63/677,849, filed on Jul. 31, 2024.

(51) Int. Cl.
| | |
|---|---|
| G06F 16/00 | (2019.01) |
| G06F 9/50 | (2006.01) |
| G06F 16/22 | (2019.01) |
| G06F 16/2455 | (2019.01) |

(52) U.S. Cl.
CPC ........ *G06F 16/24553* (2019.01); *G06F 9/505* (2013.01); *G06F 16/221* (2019.01)

(58) Field of Classification Search
None
See application file for complete search history.

(56) References Cited

U.S. PATENT DOCUMENTS

| | | | |
|---|---|---|---|
| 11,537,616 B1* | 12/2022 | Lin | G06N 20/00 |
| 2022/0197306 A1* | 6/2022 | Cella | B29C 64/386 |

* cited by examiner

*Primary Examiner* — Tuankhanh D Phan
(74) *Attorney, Agent, or Firm* — Hickman Becker Bingham Ledesma LLP; C. James Oh (57) ABSTRACT

Disclosed herein are techniques related to load-aware selection of query execution databases. Techniques may include receiving a query to be executed on a database selected from a plurality of databases. Each database of the plurality of databases may have a different data layout. The techniques may also include generating, for the received query, one or more query features and one or more current load features. The one or more current load features may indicate availability of one or more computing resources for query execution on least one database of the plurality of databases. Additionally, the techniques may include generating an output based on applying a model to the one or more generated query features. The techniques may further include selecting, from the plurality of databases and based on the output, a database for executing the query. Thus, the query may be executed on the selected database.

18 Claims, 5 Drawing Sheets

LOAD-AWARE SELECTION OF QUERY EXECUTION DATABASES

BENEFIT CLAIM

This application claims the benefit of Provisional Application 63/677,849, filed Jul. 31, 2024, the entire contents of which is hereby incorporated by reference as if fully set forth herein, under 35 U.S.C. § 119(e).

TECHNICAL FIELD

The present disclosure relates to the field of database systems, and in particular to load-aware selection of query execution databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Some database implementations comprise multiple databases for maintaining data in different layouts. For example, such implementations may include a row-major database and a column-major database. The different layouts may be specialized for different types of workloads. For example, a row-major database may be specialized for transactional processing, and a column-major database may be specialized for analytical processing. Faster query execution is enabled by executing a query on the database that is specialized for processing it.

However, in some circumstances, faster query execution may not be achieved even though a query is executed on the database that is specialized for processing it. In particular, the fluctuating availability of computing resources can affect query execution times. For example, if there are many queries already running on the column-major database, then it may be faster to execute a query on the row-major database instead.

Thus, it would be beneficial and desirable to account for relative system load when selecting the database for executing a given query.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Disclosed herein are techniques related to a system's load-aware selection of the optimal query execution database. In some embodiments, machine learning is used to perform the difficult task of determining a predictive relationship between system load and query characteristics, on one hand, and the optimal database on which to execute a given query at a given point in time, on the other hand. As used herein, the optimal database in a set of databases is the database that would yield the fastest query execution time relative to any other database in the set.

System load information may be indicative of the availability of computing resources at a given point in time. Example system load information includes the length of the query queue for a particular database, the number of queries executing on a particular database, and the data manipulation propagation lag between databases.

Query characteristics information may be indicative of the amount of computing resources expected to be consumed during execution of a given query. Example query characteristics information include query complexity, the number of query blocks, the number of JOIN operations, the number of index scans or full scans involved, the volume of data processed, and the number of window operations involved.

The predictive relationship may be embodied as a model that can be applied on a per-query basis for the purpose of selecting the optimal database for query execution. For example, the model may be a classifier that takes, as input, query characteristics and current system load characteristics for the purpose of generating an output indicative of the database selected for query execution.

Advantageously, the disclosed techniques enable predicting the optimal database with increased accuracy. At the same time, these techniques are characterized by low latency in that they can be performed without resorting to the computationally intensive approach of fully optimizing a query for execution on each database (e.g., calculating the computational cost of executing a query on each database, normalizing the relative costs between query execution engines, and performing a cost comparison).

Example Database System

Figure 1:
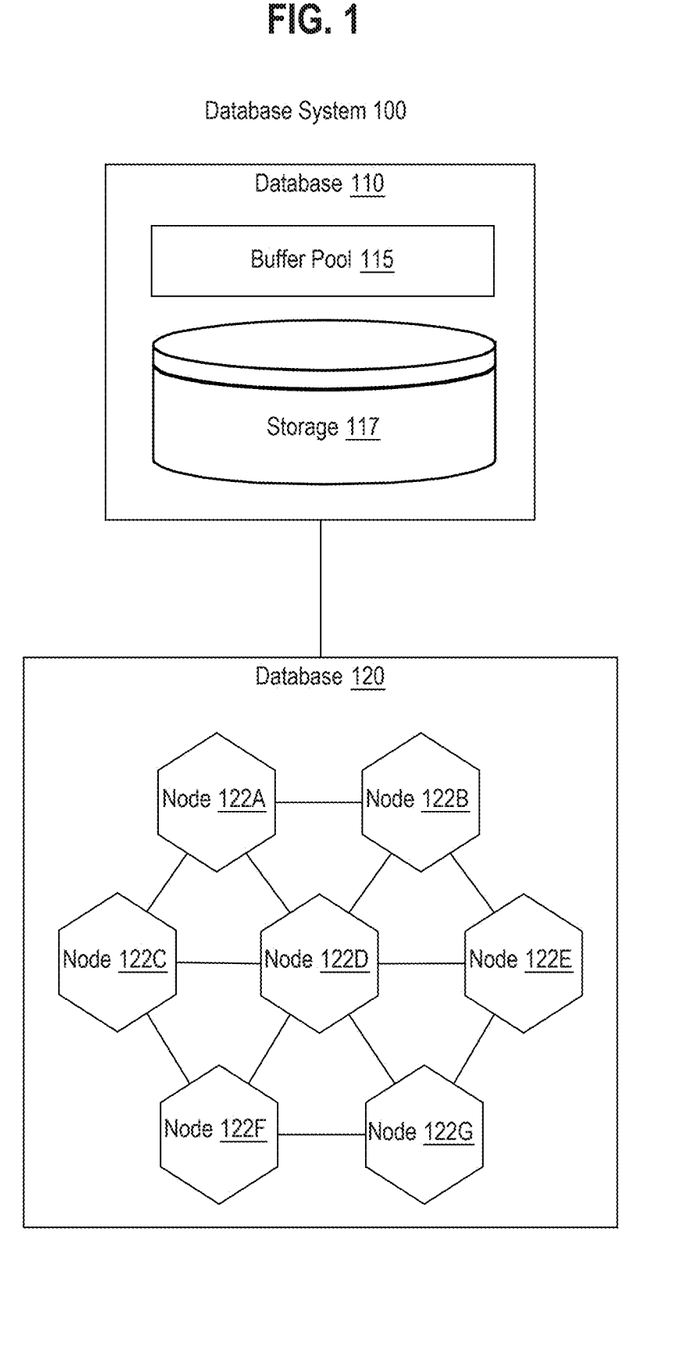
FIG. 1 depicts an example database system upon which embodiments may be implemented.

FIG. 1 depicts an example database system 100 upon which embodiments may be implemented. System 100 includes database 110 and database 120. As used herein, a database refers to an organized collection of data. Although the example of FIG. 1 depicts two databases, it should be appreciated that a database system may include more than two databases in some embodiments.

Database 110 and database 120 may be used to maintain the same data in different physical data layouts/formats. For example, database 110 may be a row-major database, and database 120 may be a column-major database. The advantage of maintaining a different physical data layout/format in each database 110, 120 is that each database 110, 120 may be specialized for a different type of workload. For example, database 110 may be a transactional database specialized for online transactional processing (OLTP) workloads, and database 120 may be an analytical database specialized for online analytical processing (OLAP) workloads.

Each database 110, 120 may be associated with a different query execution engine (not shown). As used herein, a query execution engine refers to software configured to execute queries against data in a database. Thus, there may be an engine that executes queries on database 110, and there may be another engine that executes queries on database 120. Each engine may have different query execution models, different supported query processing algorithms, and different performance characteristics. For example, the execution engine for database 110 may be single-threaded, whereas the execution engine for database 120 may be in-memory, vectorized, massively parallel, and push-based.

In the example of FIG. 1, database 110 includes buffer pool 115 and storage 117. Storage 117 may correspond to a disk that maintains the complete collection of data (e.g., all table and index data) for database 110, and buffer pool 115 may correspond to an area in main memory where a subset of the data maintained in storage 117 is cached as it is accessed.

System 100 may be implemented as a cloud-based database service. In some embodiments, system 100 corresponds to the MySQL HeatWave DBaaS developed by ORACLE INTERNATIONAL CORPORATION of Redwood Shores, California. When system 100 receives a query from a client computing device (not shown), system 100 may determine which database 110, 120 is optimal for executing the query based on applying a machine learning model to characteristics of the query and information about the system context.

This model may be implemented as MySQL server-compatible C++ code that resides on the control node of the HeatWave cluster depicted as database 120. The control node may also include database 110 such that the main node can apply the model and either execute the query on database 110 or offload the query to one or more worker nodes 122A-G for execution on database 120. Although the example of FIG. 1 depicts worker nodes 122A-G, in some embodiments, a cluster may include more than seven worker nodes or fewer than seven worker nodes.

Model Training

As mentioned above, a machine learning model may be used to determine the optimal database for executing a given query. In some embodiments, this model is a classifier. In some embodiments, this model is a decision tree model.

Offline training of the model may be performed using a simulator configured to mimic real-world conditions. A range of scenarios may be simulated by varying system load, query complexity, resource availability, etc. For example, queries may be randomly generated from Structured Query Language (SQL) syntax supported in MySQL, derived from the OLAP decision support benchmark workloads TCP-H and TPC-DS categorized by the Transaction Processing Performance Council (TPC), and/or derived from real-world internal business application workloads. Queries may be executed on each database to identify the optimal database for each of the queries.

To understand why a particular database was identified as the optimal database for executing a particular query, various feature data may be collected during query execution. Example feature data includes query execution times, query features and current load features.

Query execution times may be used to identify which database is the optimal database for a given query. Thus, if the amount of time it takes to execute a query on database 110 is less than the amount of time it takes to execute a query on database 120, then database 110 would be identified as the optimal database for executing that query.

Query features may be used to estimate the computational cost of executing a query. Example query characteristics include query length, query complexity, number of query blocks, number of JOIN statements, number of index scans involved, number of full scans involved, volume of data processed, and number of special operations (e.g., window operations) involved.

Current load features may be used to estimate the availability of computing resources at a given point in time. Example current load features include number of queries executing on database 110, query queue for database 120, a data manipulation language (DML) packet propagation lag for database 120, and buffer pool 115 usage for database 110.

In some embodiments, the collected feature data is aggregated and organized for further processing. This may involve cleaning the data, normalizing values, and handling missing or outlier data points. As will be explained in greater detail below with reference to FIG. 2B, further processing may involve normalizing query features to account for variability in current load features.

The collected feature data may be used to train the model. In preparation for model training, the collected feature data may be split into a training set and a validation set.

A decision tree algorithm may be used to train the model on the training set. The decision tree may determine patterns and relationships within the feature data.

The trained model may be validated on the validation set to ensure the model's accuracy and capability for generalization. Hyperparameters may also be tuned for increased accuracy.

In some embodiments, recursive feature elimination (RFE) may be performed to reduce the amount of feature data to those that are the most salient. For example, if the same database is predicted to be the optimal database regardless of whether query length is considered, then a more efficient model would be generated by excluding query length from the set of features used to train the model.

In some embodiments, the trained model may be adjusted based on scenarios in which the optimal database is already known. For example, it may be known that database 110 performs better than database 120 for SELECT queries with indexes or LIMIT clauses. In some embodiments, the trained model may be iteratively refined by incorporating feedback from experts and retraining with updated adjustments.

Example Database Selection Process

Figure 2A:
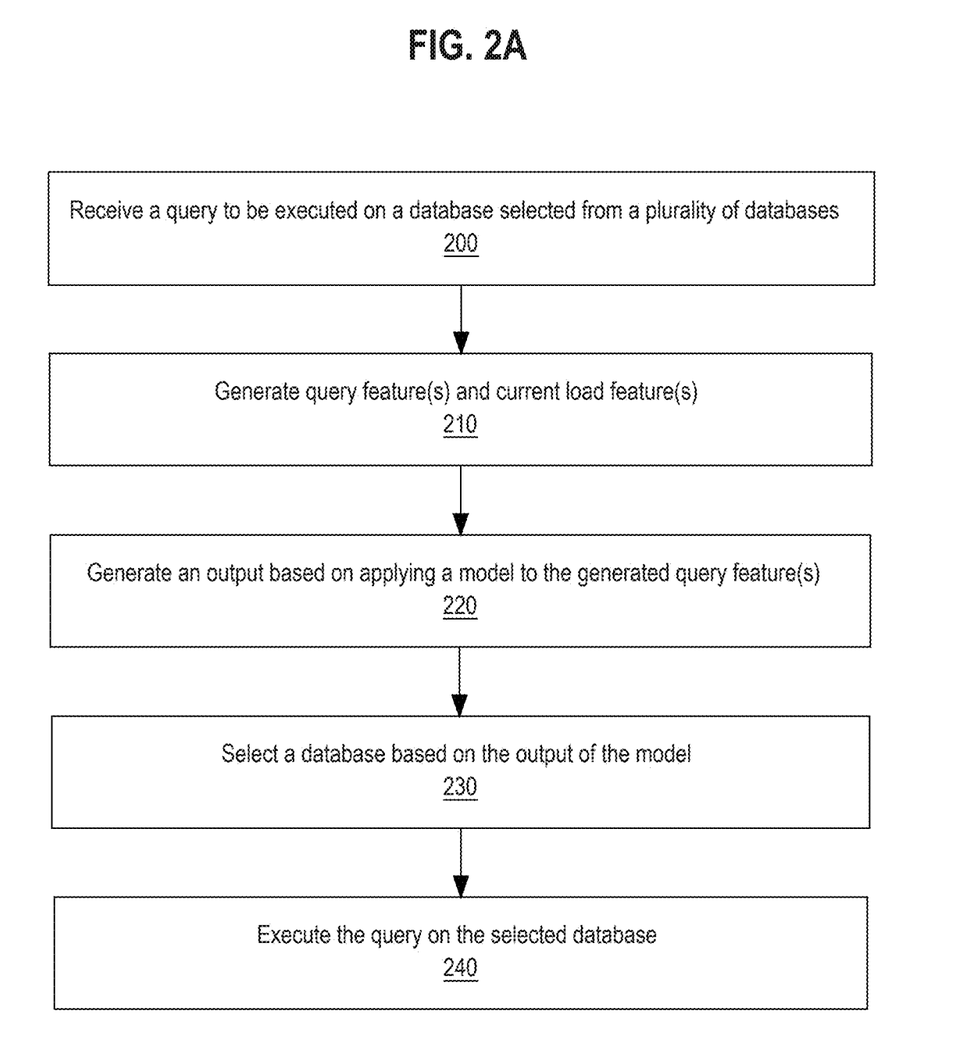
FIGS. 2A-B depict example processes for load-aware selection of query execution database.

The trained and validated model may be deployed within a query planner or parser. Model-based prediction may be performed on a per-query basis, which can take as little as 50 to 500 microseconds. FIG. 2A depicts an example model-based prediction process.

At block 200, system 100 may receive, from a client computing device, a query to be executed on a database selected from a plurality of databases. For example, the client computing device may be executing an OLTP application or an OLAP application.

Each database of the plurality of databases may have a different data layout. For example, the plurality of databases may include row-major transactional database 110 and column-major analytical database 120.

At block 210, system 100 may generate, for the query received at block 200, one or more query features. Query features are based on query-specific attributes that do not vary with system state. Thus, they remain consistent across different executions of the same query. As mentioned above, the one or more query features may include at least one of a group comprising query length, query complexity, number of query blocks, number of JOIN statements, number of index scans involved, number of full scans involved, data volume processed, and number of special operations. According to an embodiment, the query features are extracted at a stage in query compilation that forms a logical query plan. The logical query plan specifies query operations at a level that is independent of database or database system on which the query may be executed. Query features may be extracted from the logical query plan.

Additionally, system 100 may generate one or more current system load features for executing the query received at block 200. The one or more current system load features are indicative of the availability of one or more computing resources for query execution on at least one database of said plurality of databases. Current system load features vary with system state and may be continuously monitored and recorded in the context of each query execution so that the model accounts for the impact of changing system conditions on query performance. As mentioned above, the current system load features may include at least one of a group comprising a number of queries executing on a database, query queue for a database, and a data manipulation language (DML) packet propagation lag for a database.

Figure 2B:
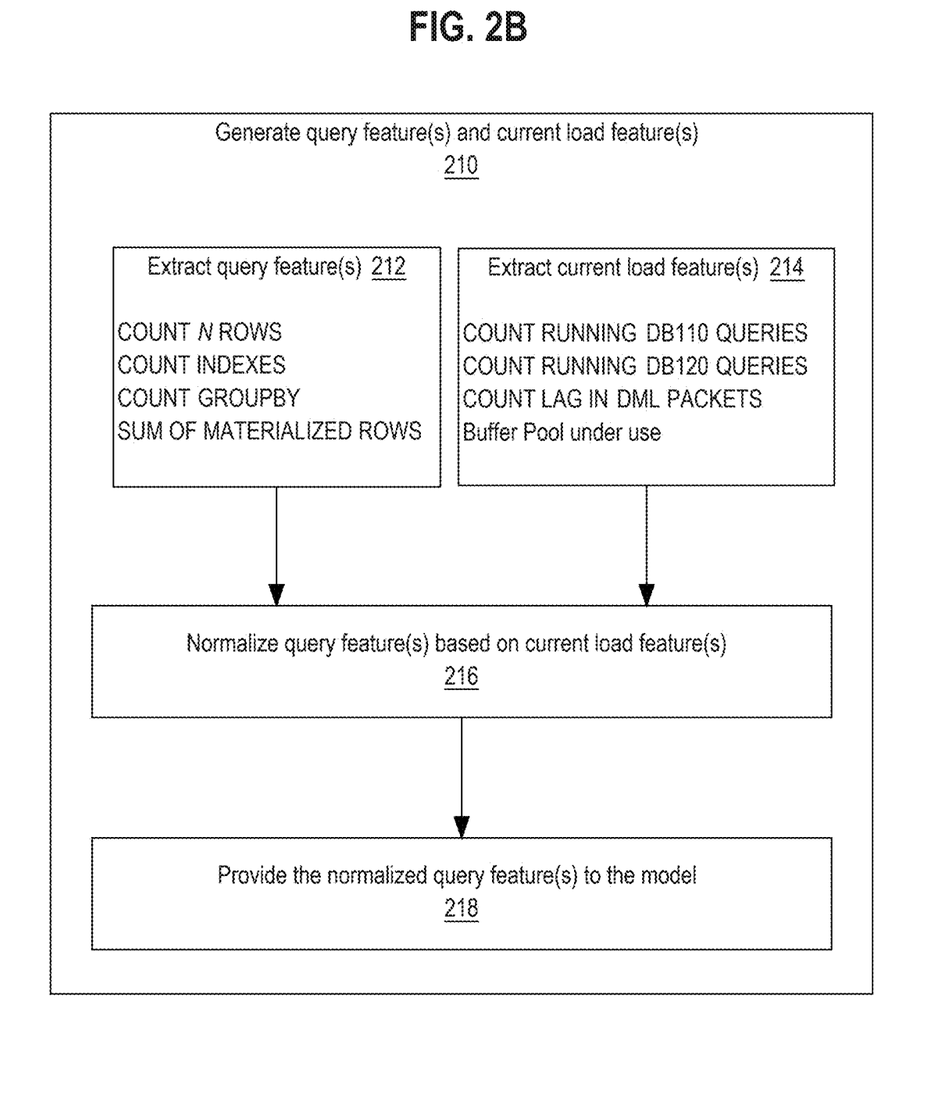

FIG. 2B depicts block 210 in greater detail. As shown in FIG. 2B, in some embodiments, block 210 may include blocks 212-218.

At block 212, system 100 may extract one or more query features from a query plan for executing the query received at block 200. Block 212 includes an example list of extracted query features.

At block 214, system 100 may extract, from the operating system, one or more current load features for executing the query received at block 200. Block 214 includes an example list of extracted current load features.

Although the example of FIG. 2B depicts query features and current load features being extracted concurrently, it should be appreciated that, in some embodiments, extracting current system load features may be performed before or after extracting query features.

At block 216, system 100 may normalize the one or more query features based on the one or more current system load features. Normalization of the one or more query features may be performed to account for the variability in current system load features. As will be explained in greater detail below, in some embodiments, normalization may involve heuristic spline fitting. By way of background, heuristic spline fitting is a data analysis technique that is commonly used to approximate curves having different shapes in different areas of the horizontal axis variable (e.g., the identity of the optimal database). The different areas are defined by knot points, which can be determined based on collected data (e.g., data collected during model training and/or validation). Approximating curves involves using the least squares method to estimate the parameters of the curves. Thus, instead of approximating a single high-degree polynomial for all the collected data, heuristic spline fitting approximates multiple low-degree polynomials in a piecewise fashion for subsets of the collected data. For example, heuristic spline fitting may be used to approximate nine cubic polynomials between each pair of ten data points as opposed to approximating a single nine-degree polynomial for all ten data points. Furthermore, the boundaries of each polynomial are defined based on database specialists' domain expertise to ensure that the boundaries have a natural alignment with different possible states of operation of the database system. For example, polynomial 1 may be a linear polynomial for normal operation state, polynomial 2 may be a squared polynomial for heavy query load on the database, polynomial 3 may be a cubic polynomial for heavy system DML command load on the database, etc.

Generally, query features (e.g., volume of data processed) exhibit a monotonic relationship with the identity of the optimal database. For example, with an increase in the number of rows involved in executing a query, there may be a corresponding increase in the likelihood of offloading the query for execution on database 120 as opposed to database 110.

However, when current system load features (e.g., number of queries executing on a database) are considered, query features may exhibit a non-linear relationship with the identity of the optimal database. For example, the volume of data being processed is the same for a single query executing on ten rows of data as it is for two queries executing in parallel on five rows of data each. Nevertheless, the single query may be offloaded for execution on database 120, whereas each of the two parallel queries may be executed on database 110.

By leveraging the monotonic relationship, the non-linear relationship may emerge as a low-degree polynomial relationship that can be determined using heuristic spline fitting. Machine learning may be used to determine the normalizing coefficient for the polynomial relationship. Continuing with the previous example, the polynomial relationship may be determined based on dividing the ten rows by the two queries or based on dividing the ten rows by the product of a normalizing coefficient multiplied to the two queries (e.g., dividing the ten rows by four if the coefficient is two), depending on training results.

Conceptually, the one or more current system load features are folded into the one or more normalized query features. Thus, at block 218, system 100 may provide the one or more normalized query features (without separately providing the one or more current load features) to the model as input.

Referring back to FIG. 2A, at block 220, system 100 may generate an output based on applying a model to the one or more generated query features. For example, if the model is a classifier, then the output may be an indication of the optimal database (e.g., database 110 or database 120).

At block 230, system 100 may select a database for executing the query. The database is selected from the plurality of databases, and the selection is based on the output of the model.

At block 240, system 100 may execute the query on the selected database. For example, if database 120 is selected to be the optimal database for executing a particular query, then the query may be offloaded to one or more slave nodes 122A-G for execution.

In some embodiments, system 100 may perform periodic (e.g., nightly) testing to detect model drift and generate an alert when a drift is detected in the model. The model may be retrained to address the drift.

Database Management System Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however, the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

A database command may also be in the form of an API call. The call may include arguments that each specifies a respective parameter of the database command. The parameter may specify an operation, condition, and target that may be specified in a database statement. A parameter may specify, for example, a column, field, or attribute to project, group, aggregate, or define in a database object.

In a DOCS, a database command may be in the form of functions or object method calls that invoke CRUD (Create Read Update Delete) operations. Create, update, and delete operations are analogous to insert, update, and delete operations in DBMSs that support SQL. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

When operations are referred to herein as being performed at commit time or as being commit time operations, the operations are performed in response to a request to commit a database transaction. DML commands may be auto-committed, that is, are committed in a database session without receiving another command that explicitly requests to begin and/or commit a database transaction. For DML commands that are auto-committed, the request to execute the DML command is also a request to commit the changes made for the DML command.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Graph Processing Systems

A graph processing system receives graph queries, executes graph queries and returns results for the graph queries. Graph queries may comply with a graph query language, such as PGQL, GQL, Cypher, Gremlin, or SPARQL.

A graph processing system may be implemented on a computing node or a multi-node system. A graph processing system may store graph data in an in-memory form in byte-addressable memory. In-memory forms include the compressed sparse row (CSR) form and reverse CSR form. A graph processing system may persistently store graph data in a DBMS to which the graph processing system is connected. The graph data may be stored in relational tables, such as vertex tables and edge tables, or documents that store vertices and edges of a graph. Alternatively, the graph data may be persistently stored in a file system, where vertices and edges of a graph are stored in CSV files. A graph may be loaded in memory in an in-memory form to execute a graph query against the graph.

A graph processing system may be integrated into a DBMS as native functionality of the DBMS. A DBMS may define a graph and one or more vertex and edge tables and documents that store vertices and edges of the graph. A DBMS may load a graph from persistent storage into byte addressable to execute a graph query against the graph. A DBMS may also rewrite a graph query into database commands, such as SQL statements, that can be executed against vertex and edge tables that store graph data.

Query Processing Overview

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation Query Optimization Overview As used herein, a query is considered "transformed" when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by transforming the query. In general, transforming a query involves rewriting a query into another query that produces the same result and that can potentially be executed more efficiently, i.e. one for which a potentially more efficient and/or less costly execution plan can be generated. A query may be rewritten by manipulating any internal representation of the query, including any copy thereof, to form a transformed query or a transformed query representation. Alternatively and/or in addition, a query may be rewritten by generating a different but semantically equivalent database statement.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depend on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria are met.

In a software implementation, when a machine learning model is referred to as receiving an input, being executed, and/or generating an output or prediction, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of the best breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neurons.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as a vector. Training data comprises multiple inputs, each being referred to as a sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Fewer neurons means fewer activation values need be computed, and/or fewer derivative values need be computed during training.

Properties of matrices used to implement a neural network correspond to neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in a matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that are not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix-based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depend on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occur as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

Software Overview

Figure 3:
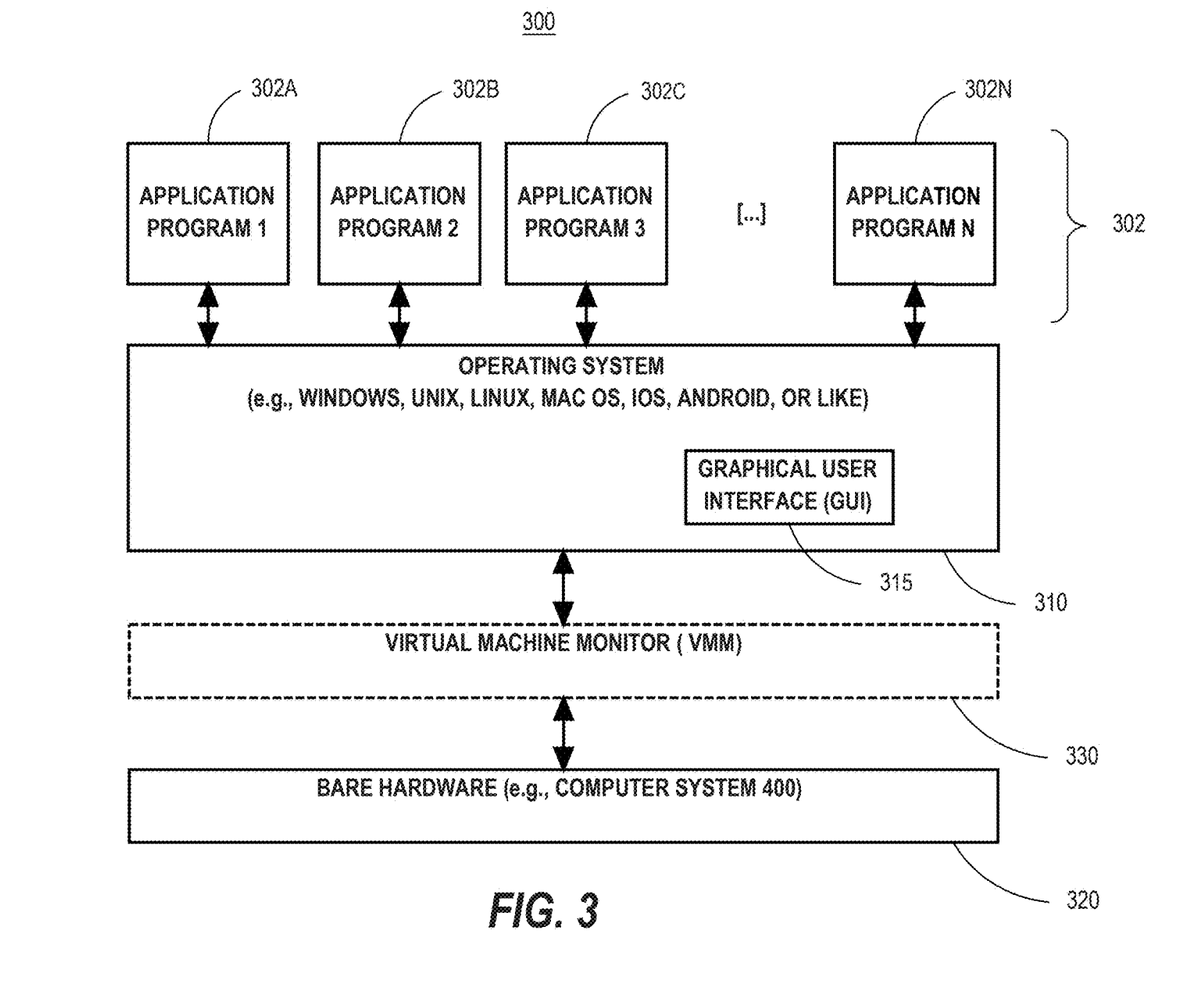
FIG. 3 depicts an example software system for controlling the operation of a computing device.
Figure 4:
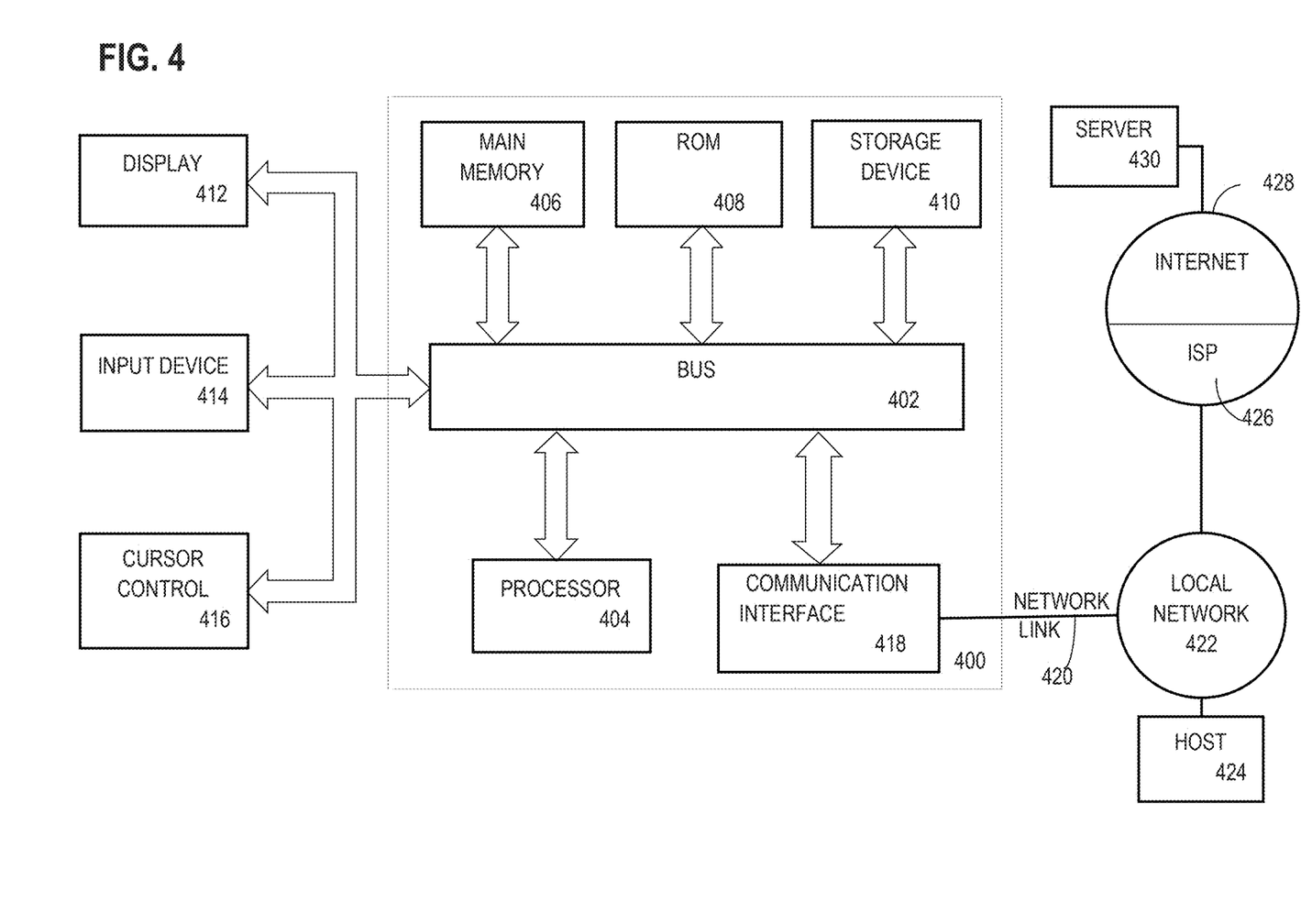
FIG. 4 depicts an example computing device upon which embodiments may be implemented.

FIG. 3 is a block diagram of a basic software system 300 that may be employed for controlling the operation of computing system 400 of FIG. 4. Software system 300 and its components, including their connections, relationships, and functions, are meant to be exemplary only and not meant to limit implementations of the example embodiment(s). Other software systems suitable for implementing the example embodiment(s) may have different components, including components with different connections, relationships, and functions.

Software system 300 is provided for directing the operation of computing system 400. Software system 300, which may be stored in system memory (RAM) 406 and on fixed storage (e.g., hard disk or flash memory) 410, includes a kernel or operating system (OS) 310.

The OS 310 manages low-level aspects of computer operation, including managing the execution of processes, memory allocation, file input and output (I/O), and device I/O. One or more application programs represented as 302A, 302B, 302C . . . 302N may be "loaded" (e.g., transferred from fixed storage 410 into memory 406) for execution by the system 300. The applications or other software intended for use on computer system 400 may also be stored as a set of downloadable computer-executable instructions, for example, for downloading and installation from an Internet location (e.g., a Web server, an app store, or another online service).

Software system 300 includes a graphical user interface (GUI) 315 for receiving user commands and data in a graphical (e.g., "point-and-click" or "touch gesture") fashion. These inputs, in turn, may be acted upon by system 300 in accordance with instructions from operating system 310 and/or application(s) 302. The GUI 315 also serves to display the results of operation from OS 310 and application(s) 302, whereupon the user may supply additional inputs or terminate the session (e.g., log off).

OS 310 can execute directly on the bare hardware 320 (e.g., processor(s) 404) of computer system 400. Alternatively, a hypervisor or virtual machine monitor (VMM) 330 may be interposed between the bare hardware 320 and the OS 310. In this configuration, VMM 330 acts as a software "cushion" or virtualization layer between OS 310 and the bare hardware 320 of the computer system 400.

VMM 330 instantiates and runs one or more virtual machine instances ("guest machines"). Each guest machine comprises a "guest" operating system, such as OS 310, and one or more applications, such as application(s) 302, designed to execute on the guest operating system. The VMM 330 presents the guest operating systems with a virtual operating platform and manages the execution of the guest operating systems.

In some instances, the VMM 330 may allow a guest operating system to run as if it is running on the bare hardware 320 of computer system 400 directly. In these instances, the same version of the guest operating system configured to execute on the bare hardware 320 directly may also execute on VMM 330 without modification or reconfiguration. In other words, VMM 330 may provide full hardware and CPU virtualization to a guest operating system in some instances.

In other instances, a guest operating system may be specially designed or configured to execute on VMM 330 for efficiency. In these instances, the guest operating system is "aware" that it executes on a virtual machine monitor. In other words, VMM 330 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., the content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but shares access to the memory allotted to the process. The memory is used to store the content of processors between the allotments when the thread is not running. The term thread may also be used to refer to a computer system process in multiple threads that are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 4 is a block diagram that illustrates a computer system 400 upon which an embodiment of the invention may be implemented. Computer system 400 includes bus 402 or another communication mechanism for communicating information and a hardware processor 404 coupled with bus 402 for processing information. Hardware processor 404 may be, for example, a general-purpose microprocessor.

Computer system 400 also includes a main memory 406, such as a random access memory (RAM) or another dynamic storage device, coupled to bus 402 for storing information and instructions to be executed by processor 404. Main memory 406 also may be used for storing temporary variables or other intermediate information during the execution of instructions to be executed by processor 404. Such instructions, when stored in non-transitory storage media accessible to processor 404, render computer system 400 into a special-purpose machine that is customized to perform the operations specified in the instructions.

Computer system 400 further includes read-only memory (ROM) 408 or other static storage device coupled to bus 402 for storing static information and instructions for processor 404. A storage device 410, such as a magnetic disk, optical disk, or solid-state drive, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware, and/or program logic, which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infra-red detector can receive the data carried in the infra-red signal, and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426, in turn, provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420, and communication interface 418. In the Internet example, a server 430 might transmit a requested code for an application program through Internet 428, ISP 426, local network 422, and communication interface 418.

The received code may be executed by processor 404 as it is received and/or stored in storage device 410 or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community, while a hybrid cloud comprises two or more types of cloud (e.g., private, community, or public) that are bound together by data and application portability.

Generally, a cloud computing model enables some of those responsibilities which previously may have been provided by an organization's own information technology department to instead be delivered as service layers within a cloud environment for use by consumers (either within or external to the organization, according to the cloud's public/private nature). Depending on the particular implementation, the precise definition of components or features provided by or within each cloud service layer can vary, but common examples include Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications and/or provision processing, storage, networks, and other fundamental computing resources, while an IaaS provider manages or controls the underlying physical cloud infrastructure (i.e., everything below the operating system layer). Database as a Service (DBaaS), in which consumers use a database server or Database Management System that is running upon a cloud infrastructure, while a DbaaS provider manages or controls the underlying cloud infrastructure, applications, and servers, including one or more database servers.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory and that causes the hardware processor to load data at that memory address into any of the registers. In addition, a hardware processor may have access to its separate exclusive memory that is not accessible to other processors. One or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method performed by one or more computing devices, said method comprising:
   receiving a query to be executed on a database selected from a plurality of databases, each database of said plurality of databases having a different data layout;
   extracting, for said received query, one or more query features and one or more current load features, said one or more current load features indicating availability of one or more computing resources for query execution on at least one database of said plurality of databases;
   normalizing said one or more query features to account for variability in said one or more current load features;
   generating an output based on applying a model to said one or more normalized query features;
   selecting, from said plurality of databases and based on said output, a database for executing said query; and
   executing said query on said selected database.

2. The method of claim 1, wherein said plurality of databases includes a row-major database and a column-major database.

3. The method of claim 1, wherein said plurality of databases includes a transactional database and an analytical database.

4. The method of claim 1, wherein said model is a classifier.

5. The method of claim 1, wherein said model is a decision tree model.

6. The method of claim 1, wherein said one or more query features includes at least one of a group comprising query length, query complexity, number of query blocks, number of JOIN statements, number of index scans involved, number of full scans involved, data volume processed, and number of special operations.

7. The method of claim 1, wherein said one or more current load features includes at least one of a group comprising a number of queries executing on a database, query queue for a database, and a data manipulation language (DML) packet propagation lag for a database.

8. The method of claim 1, wherein normalizing said one or more query features involves heuristic spline fitting.

9. The method of claim 1, further comprising generating an alert when a drift is detected in said model.

10. One or more non-transitory storage media storing one or more sequences of instructions which, when executed by one or more computing devices, cause:
    receiving a query to be executed on a database selected from a plurality of databases, each database of said plurality of databases having a different data layout;
    extracting, for said received query, one or more query features and one or more current load features, said one or more current load features indicating availability of one or more computing resources for query execution on at least one database of said plurality of databases;
    normalizing said one or more query features to account for variability in said one or more current load features;
    generating an output based on applying a model to said one or more normalized query features;
    selecting, from said plurality of databases and based on said output, a database for executing said query; and
    executing said query on said selected database.

11. The one or more non-transitory storage media of claim 10, wherein said plurality of databases includes a row-major database and a column-major database.

12. The one or more non-transitory storage media of claim 10, wherein said plurality of databases includes a transactional database and an analytical database.

13. The one or more non-transitory storage media of claim 10, wherein said model is a classifier.

14. The one or more non-transitory storage media of claim 10, wherein said model is a decision tree model.

15. The one or more non-transitory storage media of claim 10, wherein said one or more query features includes at least one of a group comprising query length, query complexity, number of query blocks, number of JOIN statements, number of index scans involved, number of full scans involved, data volume processed, and number of special operations.

16. The one or more non-transitory storage media of claim 10, wherein said one or more current load features includes at least one of a group comprising a number of queries executing on a database, query queue for a database, and a data manipulation language (DML) packet propagation lag for a database.

17. The one or more non-transitory storage media of claim 10, wherein normalizing said one or more query features involves heuristic spline fitting.

18. The one or more non-transitory storage media of claim 10, wherein said one or more sequences of instructions further comprise instructions which, when executed by said one or more computing devices, cause generating an alert when a drift is detected in said model.

* * * * *